(12) United States Patent
Katsumura et al.

(10) Patent No.: US 8,120,743 B2
(45) Date of Patent: Feb. 21, 2012

(54) LIQUID CRYSTAL DISPLAY DEVICE AND PRODUCTION METHOD THEREOF

(75) Inventors: Nobuhito Katsumura, Yokohama (JP); Hiroaki Miwa, Yokohama (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 46 days.

(21) Appl. No.: 11/829,992

(22) Filed: Jul. 30, 2007

(65) Prior Publication Data

US 2008/0062374 A1  Mar. 13, 2008

(30) Foreign Application Priority Data

Sep. 7, 2006  (JP) .................................. 2006-242602

(51) Int. Cl.
*G02F 1/1339*  (2006.01)
(52) U.S. Cl. ......................... 349/153; 349/155; 349/190
(58) Field of Classification Search .................. 349/153, 349/190, 84, 155
See application file for complete search history.

(56) References Cited

U.S. PATENT DOCUMENTS

| | | | | | |
|---|---|---|---|---|---|
| 4,600,273 | A | * | 7/1986 | Ohno | 349/155 |
| 5,338,240 | A | * | 8/1994 | Kim | 445/24 |
| 5,969,784 | A | * | 10/1999 | Miyazaki et al. | 349/155 |
| 6,163,357 | A | * | 12/2000 | Nakamura | 349/155 |
| 6,384,882 | B1 | * | 5/2002 | Nagayama et al. | 349/110 |
| 6,570,639 | B1 | * | 5/2003 | Manabe et al. | 349/190 |
| 6,636,290 | B1 | * | 10/2003 | Glownia et al. | 349/187 |
| 6,734,945 | B2 | * | 5/2004 | Nakayoshi et al. | 349/155 |
| 7,006,178 | B2 | * | 2/2006 | Lee et al. | 349/110 |
| 7,154,578 | B2 | * | 12/2006 | Kim | 349/153 |
| 2003/0112404 | A1 | * | 6/2003 | Kim | 349/153 |
| 2004/0223093 | A1 | | 11/2004 | Nakayoshi et al. | |

FOREIGN PATENT DOCUMENTS

| | | |
|---|---|---|
| JP | 07-281197 | 10/1995 |
| JP | 10-268278 | 10/1998 |
| JP | 2001-330848 | * 11/2001 |
| JP | 2002-107740 | 4/2002 |
| JP | 2002-357834 | 12/2002 |
| JP | 2004-144972 | 5/2004 |
| JP | 2004-329692 | 11/2004 |

* cited by examiner

*Primary Examiner* — Mark Robinson
*Assistant Examiner* — Robert Tavlykaev
(74) *Attorney, Agent, or Firm* — Antonelli, Terry, Stout & Kraus, LLP.

(57) ABSTRACT

A production method of a liquid crystal display device that is constructed by placing liquid crystals between a first substrate and a second substrate. The production method includes a step of applying seal material onto the first substrate such that the seal material surrounds a liquid crystal filling area, and a step of bonding the first substrate and the second substrate together. The layer of the seal material is formed such that the thickness becomes smaller than the thickness of the liquid crystal layer in the portion corresponding to the display area when the first substrate and the second substrate are bonded together.

26 Claims, 13 Drawing Sheets

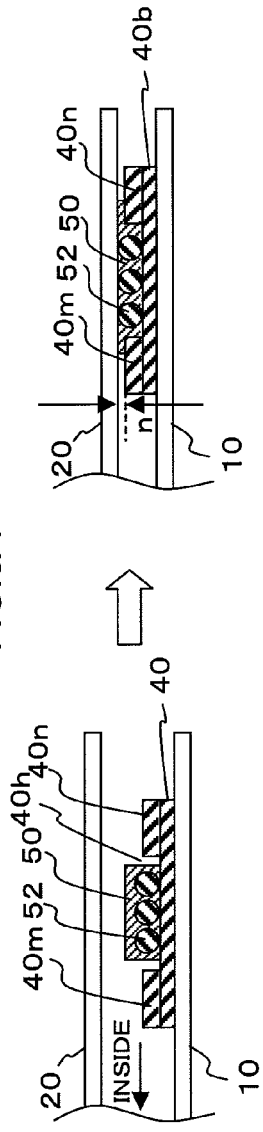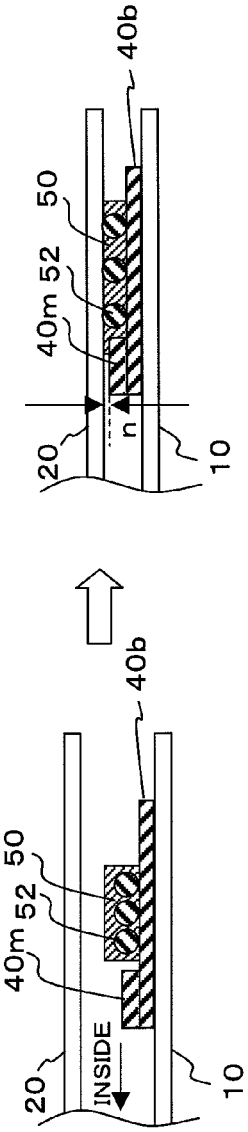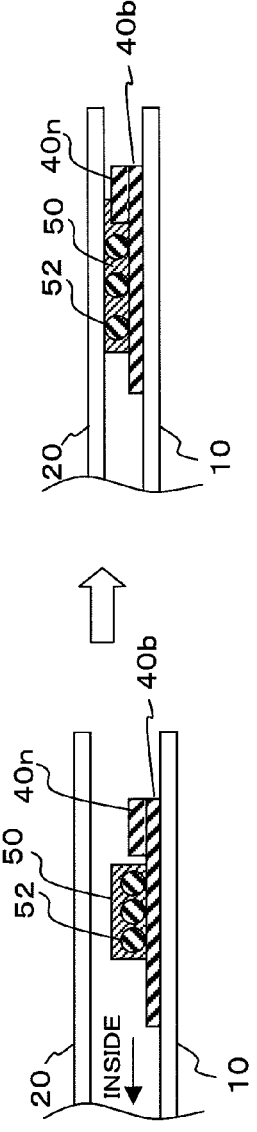

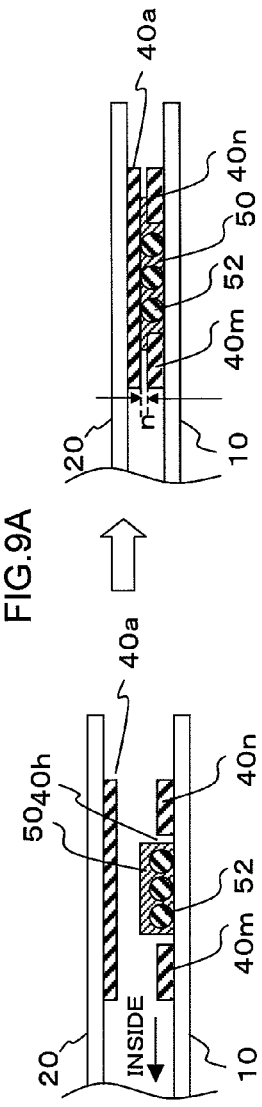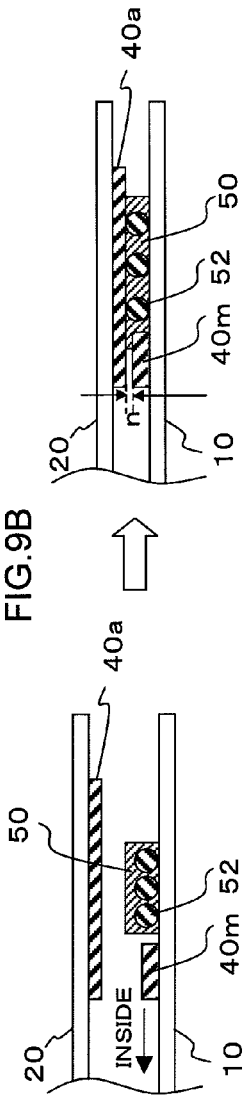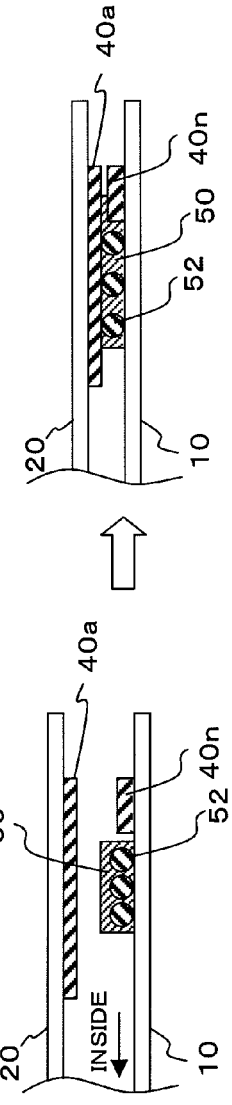

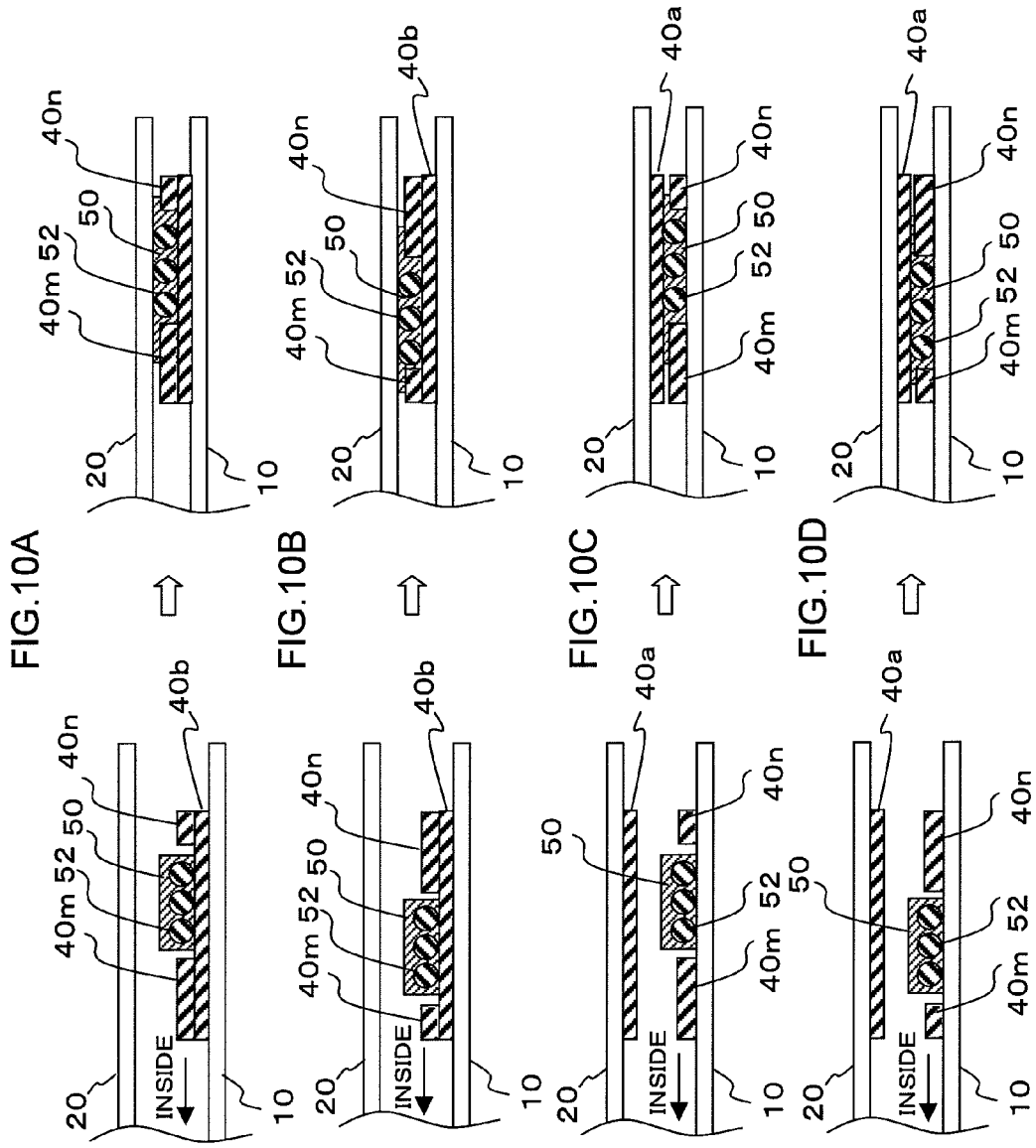

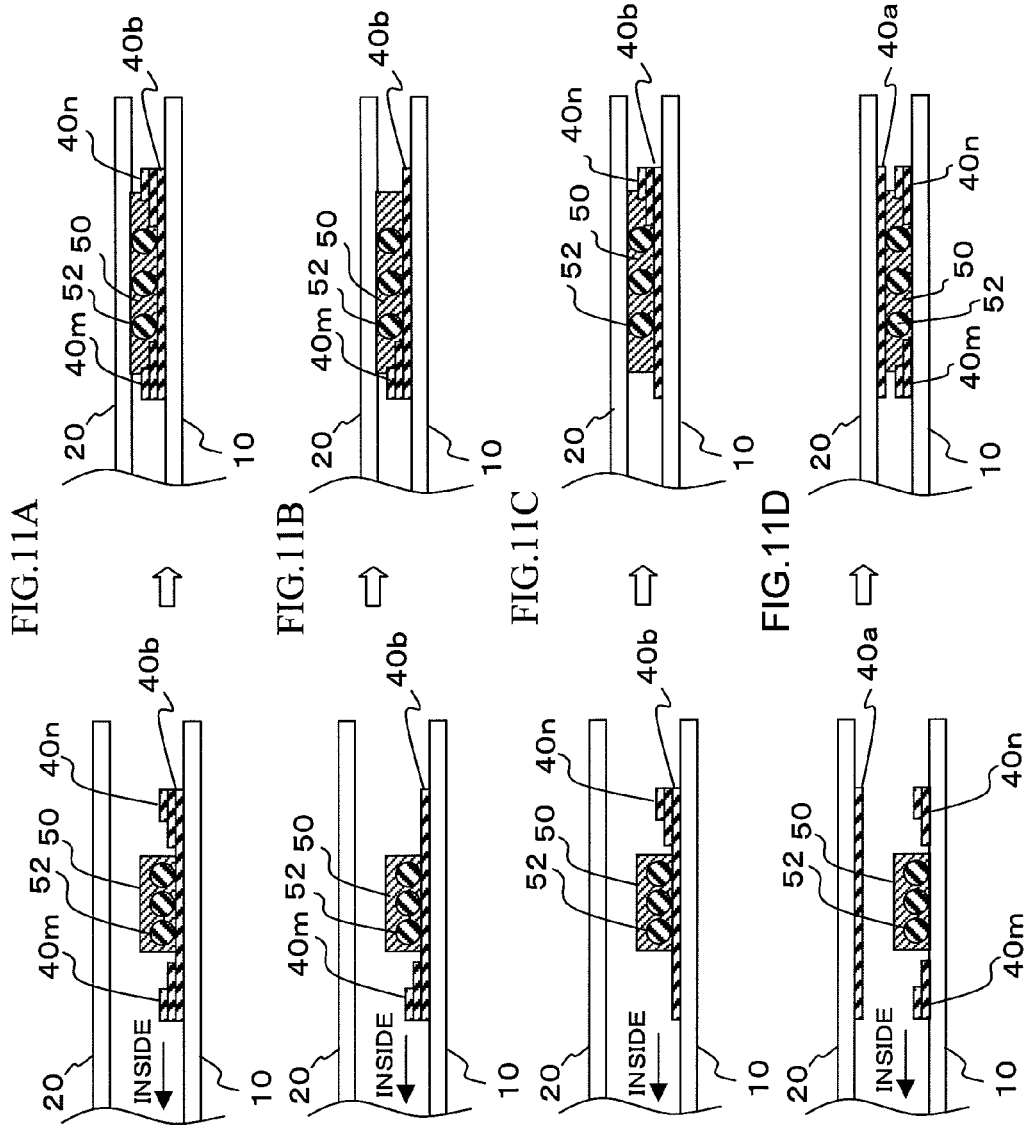

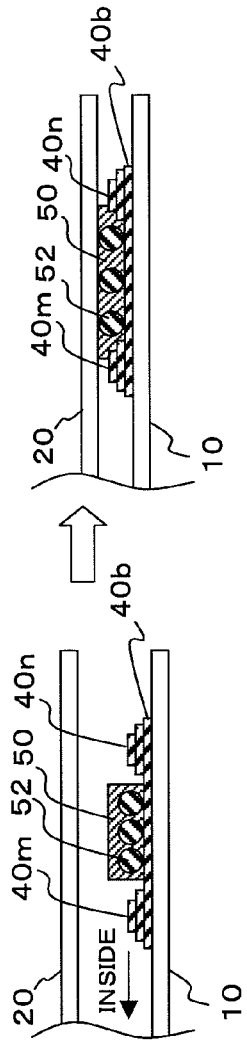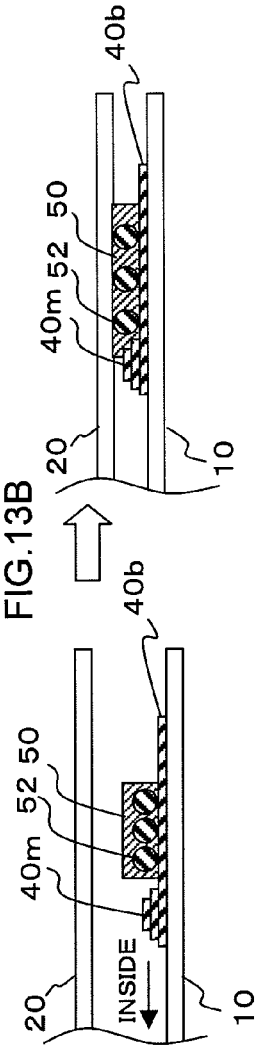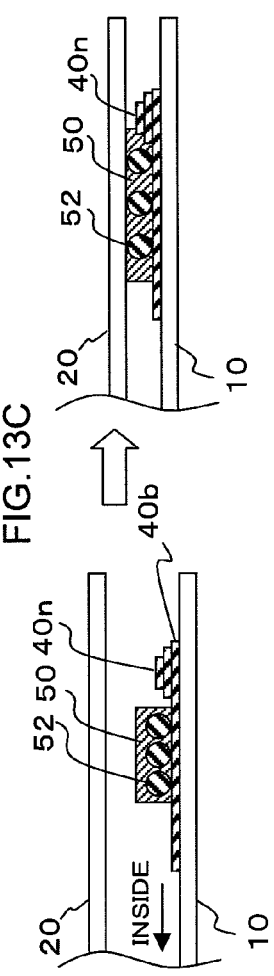

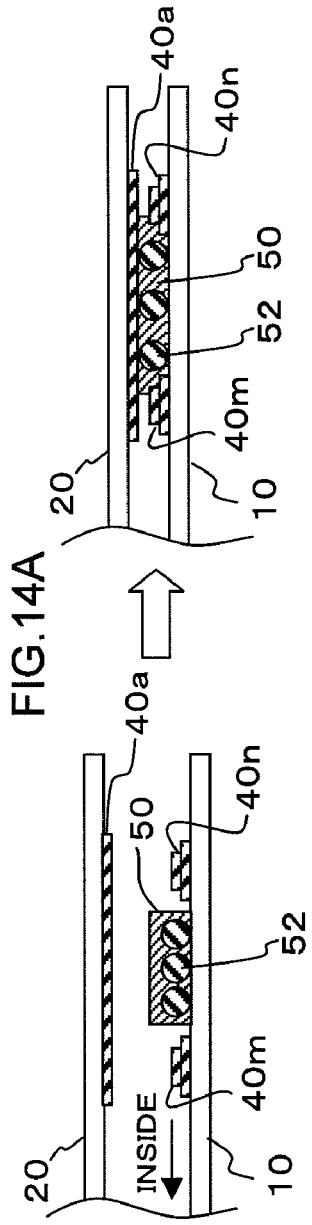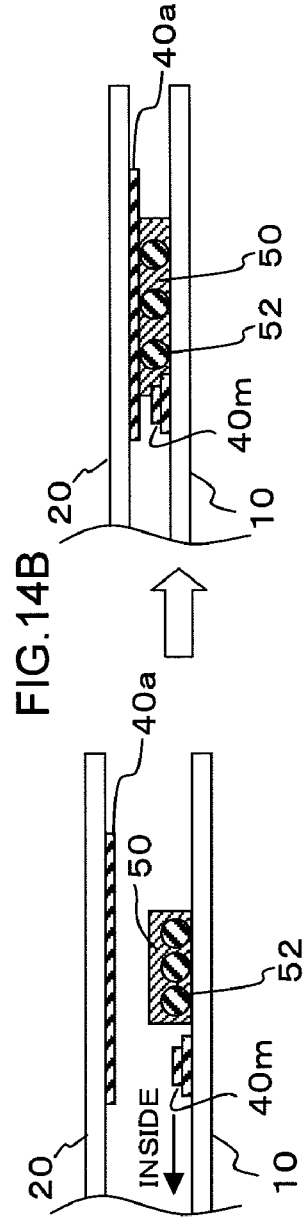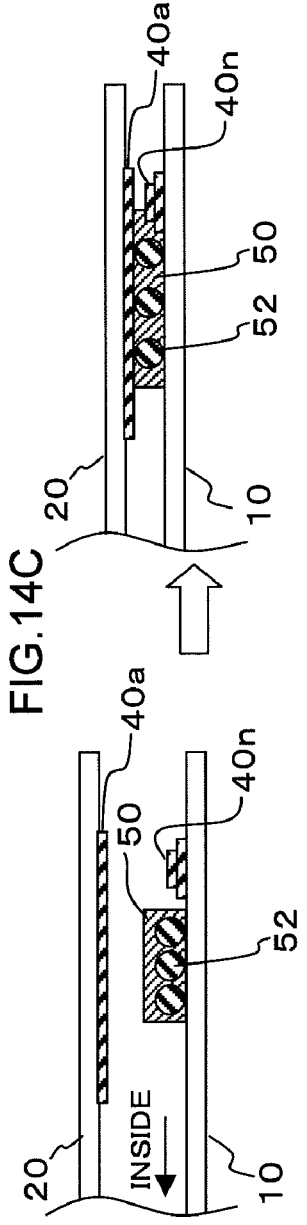

LIQUID CRYSTAL DISPLAY DEVICE AND PRODUCTION METHOD THEREOF

TECHNICAL FIELD

The present invention relates to a liquid crystal display device and a production method thereof.

BACKGROUND ART

There is known a liquid crystal display panel that comprises a TFT substrate on which thin-film transistor (TFT) elements are formed, a color filter (CF) substrate on which a color filter is formed, and liquid crystals placed between these two substrates. The following method is employed to fill liquid crystals into such a panel. A pattern is formed around a display area by using a seal material such as a thermosetting resin in order to hold the liquid crystals between the two substrates. This pattern has an injection port for injecting liquid crystals. After the seal material hardens, liquid crystals are filled through the injection port, and then the injection port is plugged. However, a lot of time is required for sealing the liquid crystals. As a method of solving such a problem, One Drop Filling (ODF) is known (See Patent Document 1).

According to ODF, a seal pattern is formed on one substrate by using a dispenser or by screen printing. Then, a predetermined amount of liquid crystals are dropped on the substrate on which the seal pattern has been formed. This substrate is aligned with the other substrate in a vacuum, to superimpose the two substrates and to press and stick them together.

According to the method of injecting liquid crystals, liquid crystals are injected after hardening of the seal material. As a result, a problem such as penetration of the liquid crystals into the seal material or flowing of the liquid crystals over the seal material does not occur. On the other hand, according to ODF, liquid crystals are dropped while seal material is in a soft state before hardening, and the substrates are attached and pressed to be bonded together by the atmospheric pressure while the seal material is hardening. Thus, since the liquid crystals in the panel are pressed by the two substrates, there occurs a phenomenon such as penetration of the liquid crystals into the seal material or overflow and leakage of the liquid crystals from the seal material, when the amount of the dropped liquid crystals is excessive. In this regard, Patent Document 1 describes a technique of preventing leakage of excessive liquid crystals by in-line control of an amount of the dropped liquid crystals and in-line recovery of the surplus.

Patent Document 1: Japanese Unexamined Patent Application Laid-Open No. 2002-107740

SUMMARY OF THE INVENTION

Unfavorably, however, in-line control of an amount of the dropped liquid crystals and in-line recovery of the excessive dropped liquid crystals lead to an increase in required equipment investment and required processes.

The present invention has been made to solve the above problems, and an object of the invention is to suppress penetration of excessive liquid crystals into a seal part and leakage of the excessive liquid crystals.

To solve the above problems, the inventors of the present invention have found that by making a seal material layer thinner, it is possible to curtail penetration of excessive liquid crystals into the seal part. Thus, according to the present invention, the thickness of the seal material layer is made the same as or smaller than the thickness of a liquid crystal layer in a portion corresponding to the display area. To that end, for example, at least one substrate is provided with a seating layer (as exemplified by a seat layer, a pedestal layer, or a base layer) for applying seal material.

For example, in a first mode of the present invention a liquid crystal display device is provided comprising a first substrate, a second substrate, and liquid crystals placed between the first and second substrates, wherein: the first substrate and the second substrate bonded by means of a seal material provided such that the seal material surrounds an area to be filled with the liquid crystals. Layer thickness of the seal material is smaller than layer thickness of the liquid crystals in a portion corresponding to a display area.

Further, in a second mode of the present invention a liquid crystal display device production method is provided for producing a liquid crystal display device that comprises a first substrate, a second substrate and liquid crystals placed between the first and second substrates, wherein: the liquid crystal display device production method comprises: a step of applying a seal material onto the first substrate such that the seal material surrounds an area to be filled with the liquid crystals; and a step of bonding the first substrate and the second substrate together. A layer of the seal material is formed such that thickness of the seal material is smaller than thickness of a layer of the liquid crystals in a portion corresponding to a display area, when the first substrate and the second substrate are bonded together.

BRIEF DESCRIPTION OF THE DRAWINGS

FIGS. 8A-8C are cross sections of a liquid crystal display device to which a sixth embodiment of the present invention is applied;

FIGS. 9A-9C are cross sections of a liquid crystal display device to which a seventh embodiment of the present invention is applied;

FIGS. 10A-10D are cross sections of a liquid crystal display device to which an eighth embodiment of the present invention is applied;

FIGS. 11A-11D are cross sections of a liquid crystal display device to which a ninth embodiment of the present invention is applied;

FIGS. 13A-13C are cross sections of a liquid crystal display device to which an eleventh embodiment of the present invention is applied; and FIGS. 14A-14C are cross sections of a liquid crystal display device to which a twelfth embodiment of the present invention is applied.

DETAILED DESCRIPTION OF PREFERRED EMBODIMENTS

Figure 1:
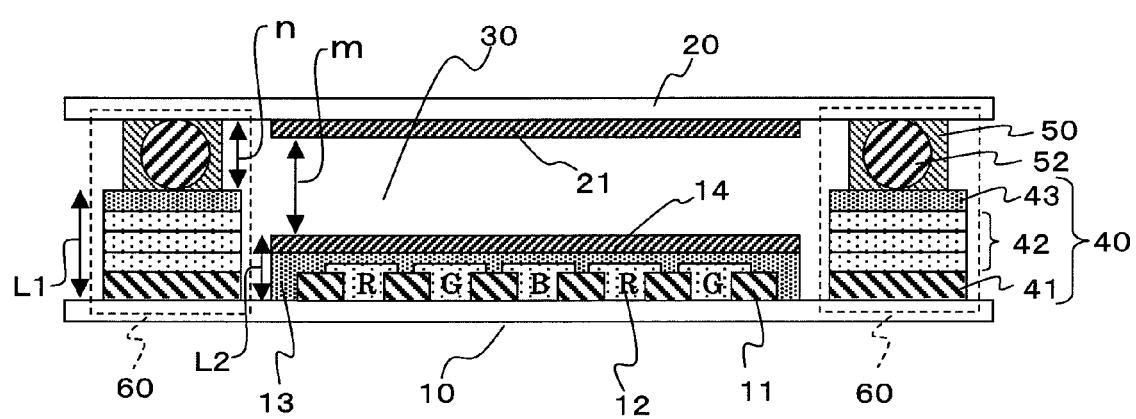
FIG. 1 is a cross section of a liquid crystal display device to which one embodiment of the present invention is applied.

FIG. 1 is a cross section of a liquid crystal display device to which one embodiment of the present invention is applied. As shown in the figure, the liquid crystal display device comprises a first substrate 10, a second substrate 20, a liquid crystal layer 30, and a seal part 60.

The first substrate 10 is what is called a color filter substrate. On the surface opposed to the second substrate 20, the first substrate 10 has a black matrix layer 11, colored resist layers 12 of red (R), green (G) and blue (B), an overcoat layer 13 for flattening the colored resist layers 12, and an alignment film 14.

The liquid crystal display device of FIG. 1 employs In-Plane-Switching (IPS), and thus the first substrate 10 does not have a transparent electrode layer. However, the present invention can be applied to liquid crystal displays other than IPS types. In that case, a transparent electrode layer exists between the overcoat layer 13 of the first substrate 10 and the alignment film 14.

The second substrate 20 is what is called a TFT substrate, and has an alignment film 21 on the surface opposed to the first substrate 10.

The liquid crystal layer 30 is held between the first substrate 10 and the second substrate 20, and oriented by the alignment films 14 and 21.

The seal part 60 is provided in order to seal the liquid crystals 30 placed between the first substrate 10 and the second substrate 20. Seen from the top face of the liquid crystal display device, the seal part 60 is represented as a closed curve of a rectangular shape surrounding an area to be filled with the liquid crystals 30 (see perspective views of FIGS. 2(C) and 2(D)). The seal part 60 comprises a seal seating layer 40 and seal material 50. The seal seating layer 40 is also as exemplified by a seat layer, a pedestal layer, or a base layer, and the seal material 50 is applied thereon for instance.

The seal seating layer 40 is a pedestal for the seal material 50 that is applied for bonding the first and second substrates 10, 20 together. The seal seating layer 40 is provided so that the thickness (sealing gap) n of the layer of the seal material 50 becomes the same as or smaller than the thickness (cell gap) m of the portion corresponding to the display area of the liquid crystals 30. The thickness L1 of the seal seating 40 is the same as or thicker than the thickness L2 of the portion corresponding to the display area of a color filter layer formed on the first substrate 10.

The thickness L1 of the seal seating layer 40 is within a range of between 1 and 4 μm, for example, and preferably thicker than the thickness L2 of the color filter layer by 0-3 μm.

There is no particular restriction on the material of the seal seating layer 40. However, in cases where the seal seating layer 40 is formed at the same time in the process of forming the color filter, then the seal seating layer 40 is formed by stacking a layer 41 of the same material as the black matrix 11, layers 42 of the same materials as the colored resist layers 12, and a layer 43 of the same material as the overcoat layer 13.

The seal material 50 bonds the seal seating layer 40 to the second substrate 20. Owing to the existence of the seal seating layer 40, the thickness (sealing gap) n of the seal material 50 is the same as or narrower than the thickness (cell gap) m of the portion corresponding to the display area of the liquid crystals 30.

Since the cell gap m is usually within a range of between 3 and 5 μm, it is preferable that the sealing gap n is in a range between 1 and 5 μm. When the sealing gap n is too large, a phenomenon in which the liquid crystals 30 penetrate into the seal material 50 tends to occur. On the other hand, when the sealing gap n is too small, the adhesion reliability decreases.

A material that is generally used for bonding together substrates of a liquid crystal display device can be used as the seal material 50. The seal material 50 includes spacer members (gap material) 52 in order to ensure the desired sealing gap n. Preferably, the spacer members 52 are un-deformable fine particles of an insulating material. For example, silica beads or silica fiber having a diameter of 1 μm may be used.

Next, a production method of the liquid crystal display device of the above configuration will be described. The production method of the present embodiment is characterized by a process of bonding two substrates together. Panel production processes other than that can employ a known method, and a description thereof will be omitted.

The present embodiment employs ODF as a liquid crystal filling method, and consideration has been given to application of a seal material in that method.

Figure 2:
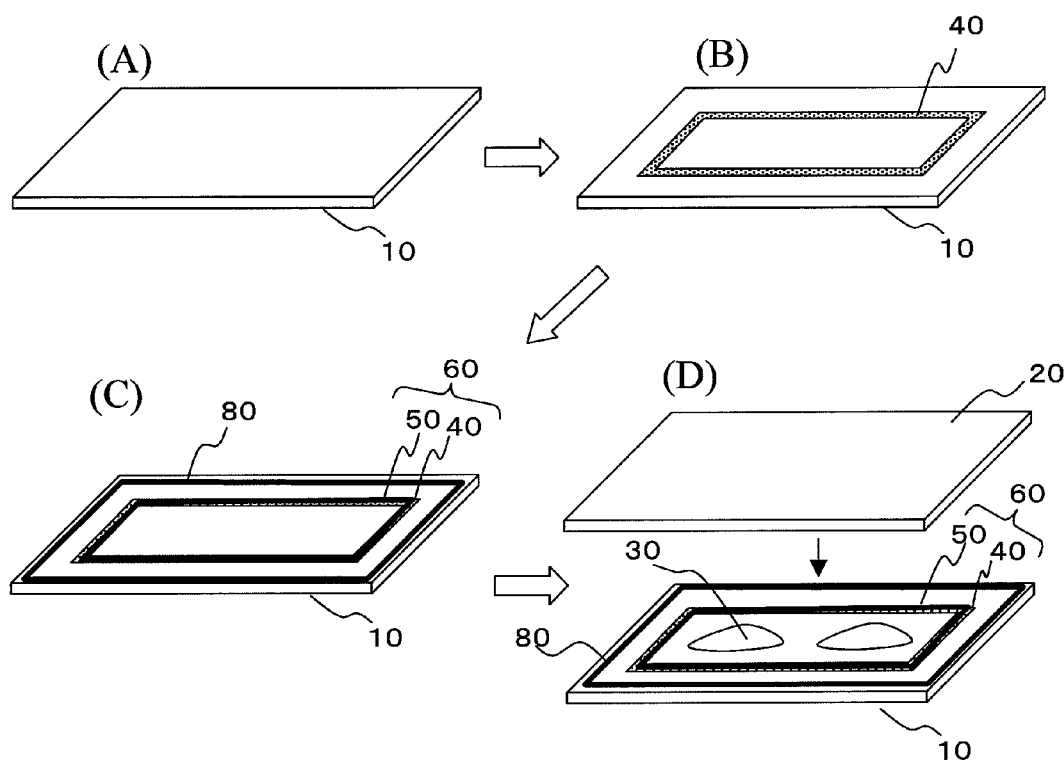
FIG. 2 is a view for explaining a production process of a liquid crystal display device.

FIG. 2 explains the process up to bonding of the first substrate 10 to the second substrate 20.

The production method of the present embodiment is suitable for producing a small-sized panel that is easily influenced by variation in amounts of dropped liquid crystals. For example, the method is suitable for production of a panel having a panel size (diagonal size) of 0.8-12 inches. Substrate size is not limited, and a multitude of small panels can be arranged on the main surface of the substrates.

It is assumed that the gap members (spacers) of about 4 μm in height are arranged on the first substrate for maintaining suitable space between the first and second substrates.

The seal seating layer 40 is formed on the first substrate 10 (see FIGS. 2(A) and 2(B). The seal seating layer 40 is formed to surround the area to be filled with the liquid crystals 30. Further, to prevent leakage of liquid crystals, the seal seating layer 40 is formed as a closed curve. The line width is about 0.8 mm. On the other hand, the line width of the seal material applied on the seal seating layer 40 is about 0.65 mm. Assuming that the patterning accuracy of the seal material 50 is ±0.1 mm, it is preferable that the line width of the seal seating layer 40 is wider than the line width of the seal material 50 by 0.1 mm or more.

The seal seating layer 40 can be formed by using a color filter layer forming process. That is, when the black matrix layer 11, the RGB colored resist layers 12 and the overcoat layer 13 are formed one by one by photo lithography, the layers 41, 42 and 43, corresponding to those layers, are also stacked at a position corresponding to the seal part 60. As a result, it is possible to form the seal seating layer 40 higher than the color filter layer at the display area by about 3 μm.

For example, in cases of producing a liquid crystal display device having a cell gap of 3.0 μm, it is possible to select the following film thicknesses of the layers that constitute the color filter layer and the seal seating layer 40.

film thickness of colored resist layer 12 (corresponding to layer 42)=0.7 μm film thickness of black matrix layer 11 (corresponding to layer 41)=1.0 μm film thickness of overcoat layer 13 (corresponding to layer 43)=1.1 μm In this case, the film thickness L1 of the seal seating layer 40 is L1=4.1 µm. Here, it follows that m+L2=3.0 µm+2.1 µm=5.1 µm. Thus, it is sufficient that spacer members (gap material) 52, for which n=5.1 µm−4.1 µm+0.1 µm=1.1 µm, are added to the seal material 50 to form the seal pattern.

Further, to form the liquid crystal display device having a cell gap of 4.0 µm while maintaining the above-mentioned thickness of each layer, it is sufficient that spacer members (gap material) 52 for which n=2.1 µm are added to the seal material to form the seal pattern.

On the other hand, in cases of producing a liquid crystal display device having a cell gap of 2.0 µm, a layer 42 corresponding to one color is omitted from the colored resist layers 12 formed in the seal seating layer 40, and L1=3.4 µm. Since m+L2=2.0 µm+2.1 µm=4.1 µm, it is sufficient that spacer members (gap material) 52 for which n=0.8 µm are added to the seal material 50 to form the seal patter.

Also, the seal seating layer 40 can be formed independently by hardening of a resin precursor after the color filter layer is formed. For example, a pattern is formed of material of the seal seating layer 40 by photo lithography, by using a dispenser or by screen printing at a position corresponding to the seal part 60. In this case, an acrylate resin or the like may be used as the material of the seal seating layer 40. It is preferable that the seal seating layer 40 formed of a resin precursor hardens before patterning of the seal material 50 and does not flow at normal temperature.

When the seal seating layer 40 is formed as described above, then the alignment film 14 is formed. Thereafter, the pattern of the seal material 50 is formed on the seal seating layer 40 by using a dispenser or by screen printing (See FIG. 2(C)).

The thickness of the alignment film 14 is about 0.1 µm. Thus, a layer corresponding to the alignment film 14 may be further stacked on the seal seating layer 40 by using a process for forming the alignment film 14. The pattern of the seal material 50 may be formed on the seal seating layer 40 stacked with the layer of the alignment film 14.

In that case, the first substrate 10 may be provided with a peripheral seal frame 80 along the periphery of the first substrate 10. The peripheral seal frame 80 is provided in order to seal, in a vacuum, an area between the peripheral seal frame 80 and the inner pattern of the seal material 50 when the two substrates are bonded together. By having the area in a vacuum, it is possible, after returning to atmospheric pressure, to assuredly press and attach the two substrates together by using the atmospheric pressure. The peripheral seal frame 80 is a part that is to be cut off in a chamfering process, and thus it has an essentially different role from the pattern of the seal material 50 for sealing the liquid crystals. It is possible to provide a plurality of peripheral seal frames 80 having such a function.

A material usually used for bonding substrates of a liquid crystal display device may be used as the seal material 50. For example, a UV cure resin such as an acrylate resin or a modified epoxy resin may be used. The seal material 50 is mixed with the spacer members (gap material) in order to ensure a desired thickness of the layer of the seal material 50 when the two substrates are bonded together. Preferably, the spacer members are fine particles of an insulating material. For example, the seal material 50 is mixed with 0.5-5% of beads or silica fiber having a diameter of about 1 µm.

The pattern of the seal material 50 may be formed on the second substrate 20 at a position corresponding to the seal part 60.

Next, one or two drops of the liquid crystals 30 are dropped into the display area in a vacuum, and the two substrates are bonded together and sealed (See FIG. 2(D)). Then, after returning to the atmospheric pressure, the substrates are exposed to ultraviolet irradiation. Further, by heating at about 120° C. in a heating furnace for about one hour, the seal material 50 is hardened.

Hereinabove, the process in which two substrates are bonded together and filled with liquid crystals has been described. After this process, the liquid crystal display device is completed by publicly-known production processes (such as a cleaning process, a chamfering process, a polarizing plate attaching process, or the like).

Hereinabove, the liquid crystal display device and the production method thereof, to which one embodiment of the present invention is applied, has been described.

Figure 3:
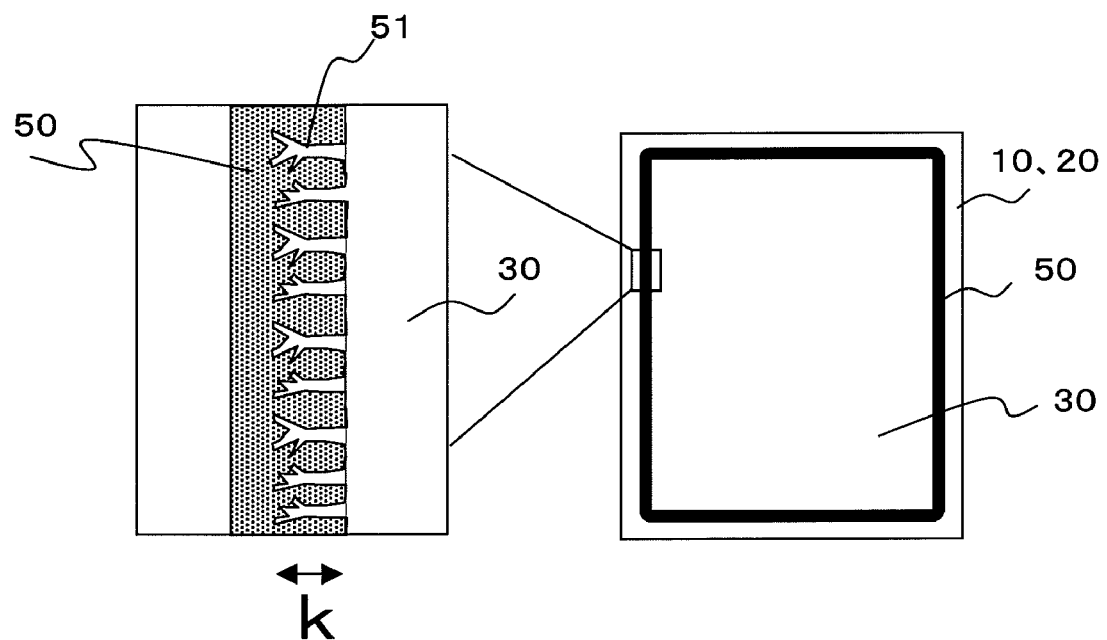
FIG. 3 is a view for explaining a phenomenon in which liquid crystals penetrate into seal material.

According to the above embodiment, it is possible to prevent penetration of the liquid crystals 30 into the seal part 60 and leakage of the liquid crystals 30 when an excessive amount of the liquid crystals 30 is dropped. That is, it is possible to suppress a phenomenon in which the liquid crystals 30 penetrate into the seal material 50 as shown in FIG. 3. In the figure, the reference numeral 51 refers to the liquid crystals 30 that have penetrated into the seal material 50. According to the above embodiment, it is possible to suppress the degree k of this type of penetration 51. In other words, it is possible to produce a panel having a cell gap that is permitted by the specification, even if the dropped amount is rougher in comparison with the conventional method.

The present invention is not limited to the above embodiment, and can be variously modified.

For example, it is sufficient if at least one of the first and second substrates 10, 20 is provided with the seal seating layer 40. That is, the seal seating layer 40 may be provided on the second substrate 20.

Figure 4:
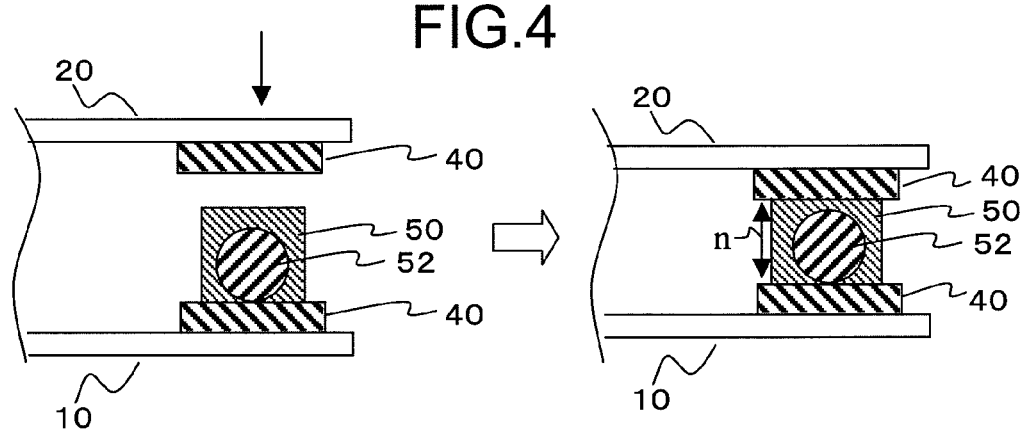
FIG. 4 is a cross section of a liquid crystal display device to which a second embodiment of the present invention is applied.

Further, as shown in FIG. 4 (a cross section showing an end portion of a liquid crystal display device), both the two substrates may be provided with respective seal seating layers 40. This arrangement also can have a smaller sealing gap n.

Figure 5:
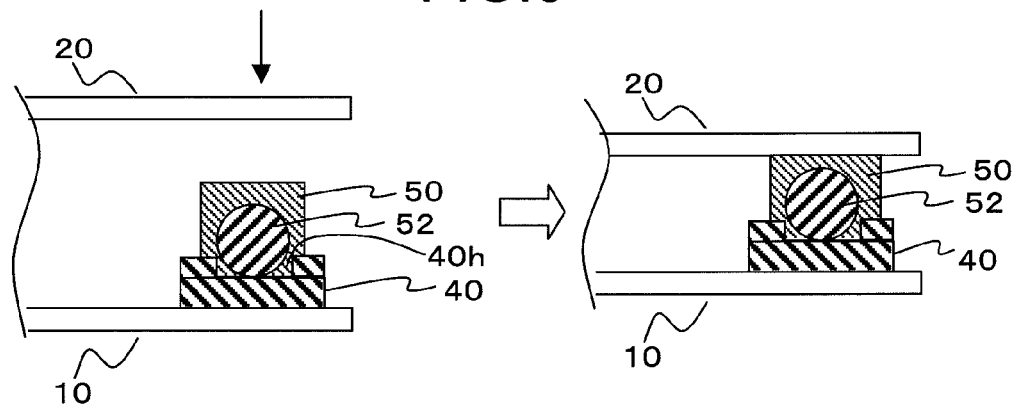
FIG. 5 is a cross section of a liquid crystal display device to which a third embodiment of the present invention is applied.

Further, as shown in FIG. 5 (a cross section of an end portion of a liquid crystal display device), a groove 40h may be provided in a seal seating layer 40 such that the gap material 52 fits into the groove 40h. Such a groove can be formed when resin layers are formed as banks on both sides of the groove by photo lithography or the like. This arrangement can hold the gap material 52 assuredly at the predetermined position of the seal seating layer 40, and can easily realize a desired sealing gap n. The gap material 52 has a size that prevents complete burying of the gap material 52 in the groove 40h. In detail, it is preferable that the ratio of the height (diameter in the case of a bead) of the gap material 52 to the depth of the groove 40h is 1.1 or more. When the ratio is smaller than 1.1, the height of the gap material 52 is too close to the height of the seal seating layer 40 and the seal seating layer 40 may come in contact with the opposing substrate (i.e. the second substrate 20). In that case, the seal material 50 remains between the seal seating layer 40 and the opposing substrate since the upper surface of the seal seating layer 40 is flat. At this time, if portions of the remaining amounts of the seal material 50 are different, variations in cell gaps result.

Figure 6:
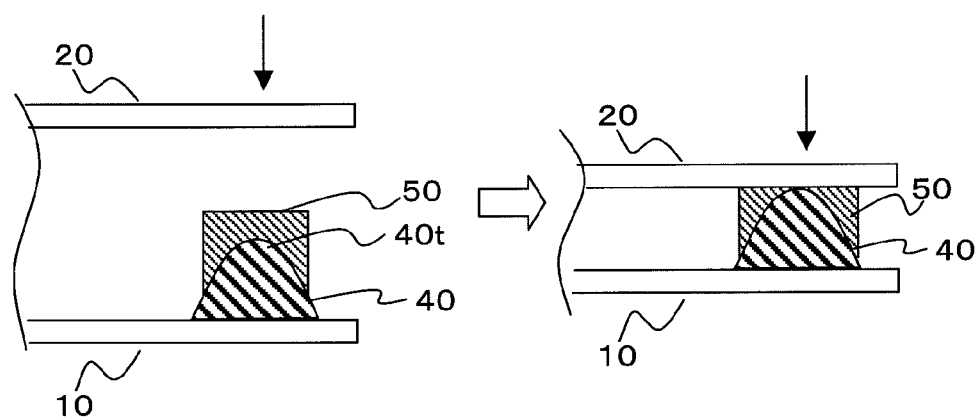
FIG. 6 is a cross section of a liquid crystal display device to which a fourth embodiment of the present invention is applied.

Further, as shown in FIG. 6 (a cross section of an end portion of a liquid crystal display device), the seal seating layer 40 may be formed into a shape such that its cross section becomes an arc (in other words, a semi-cylindrical shape) or a bulged shape. When the vertex 40t is a rounded surface in this way, the seal seating layer 40 comes in not surface but line contact with the opposed substrate, and the adhesion is improved. In other words, when the vertex is flat, an amount of the seal material 50 remaining between the seal seating layer 40 and the opposing substrate (the second substrate 20) can be reduced, and variation in gaps can be curtailed.

EXAMPLE

An example of the present invention will be described in the following, although the present invention is not limited to this example.

In the present example, the liquid crystal display device shown in FIG. 1 was produced by the production method shown in FIG. 2. In detail, a small-sized display panel of 42×31.5, i.e. a 2-inch size display panel was produced. As the gap material, polystyrene beads having a diameter of 4 μm were used.

In producing the first substrate (the color filter substrate) 10, the black matrix layer, colored resist layers of R, G and B are stacked at a position corresponding to the seal part 60. Further, an overcoat layer was formed as a film on these layers. As a result, the seal seating layer 40 was formed to have the thickness L1 larger than the thickness L2 of the display area by 3 μm. In this case, the black matrix 11 is resin having the thickness of about 1 μm.

Next, the alignment film 14 was formed in the display area of the first substrate 10, and thereafter the seal material was applied onto the seal seating layer 40 by a dispenser. The seal material 50 is an ultraviolet cure resin mixed with 0.5% of silica fiber 52 having the diameter of 1 μm.

Next, two drops of the liquid crystals 30 were dropped into the display area. The second substrate (the TFT substrate) 10 was aligned with and bonded to the first substrate in a vacuum chamber.

The chamber is returned to atmospheric pressure, and the bonded substrates were taken out, exposed to ultraviolet irradiation, and heated at 120° C. for one hour in a heating furnace to harden the seal material 50. Thereafter, the substrates were cut to complete the panel of the liquid crystal display device.

Leakage of liquid crystals did not occur in the completed panel. Also, penetration of the internal liquid crystals 30 into the seal material 50 as shown in FIG. 3 was not found.

Hereinabove, the embodiment and the example of the present invention have been described.

Lastly, form and arrangement of the seal seating layer 40 included in the present invention will be summed up.

FIGS. 7-14 are cross sections showing seal parts. Each figure shows states of the two substrates 10 and 20 before and after bonding (each left figure shows a state before bonding and each right figure shows a state after bonding). In each figure, the left side of the seal part is the panel inside that is filled with the liquid crystals 30 and becomes the display area.

Figure 7A:
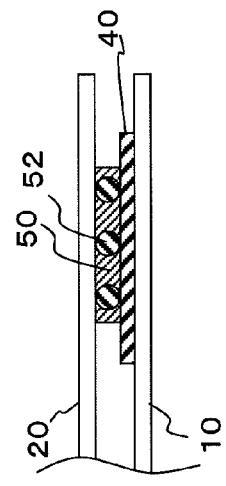
FIGS. 7A-7C are cross sections of a liquid crystal display device to which a fifth embodiment of the present invention is applied.

As shown in FIG. 7A, the seal seating layer 40 can be formed on the first substrate (the color filter substrate) 10. This shows the mode described in the above embodiment. In this case, the seal seating layer 40 can be formed at the same time with the formation of the layers that constitute a color filter, by using the materials used for forming the color filter (the colored resist layers and the black matrix layer).

Figure 7B:
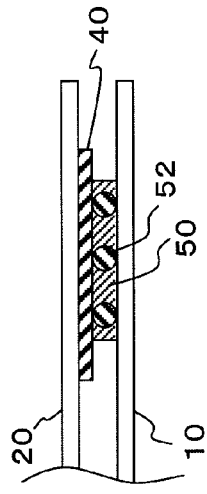

Also, as shown in FIG. 7B, the seal seating layer 40 can be formed on the second substrate (the TFT substrate) 20. In that case, the seal seating layer 40 can be formed at the same time as the formation of the layers constituting the TFT, by using the materials used for forming the TFT (a circuit film, an insulating film, a protective film, and the like).

Figure 7C:
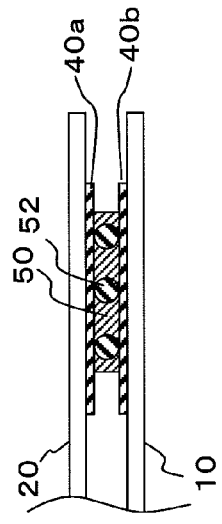
Figure 12A:
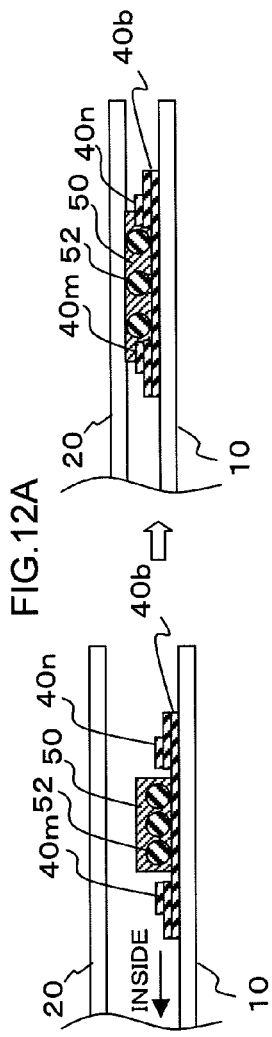
FIGS. 12A-12D are cross sections of a liquid crystal display device to which a tenth embodiment of the present invention is applied.
Figure 12B:
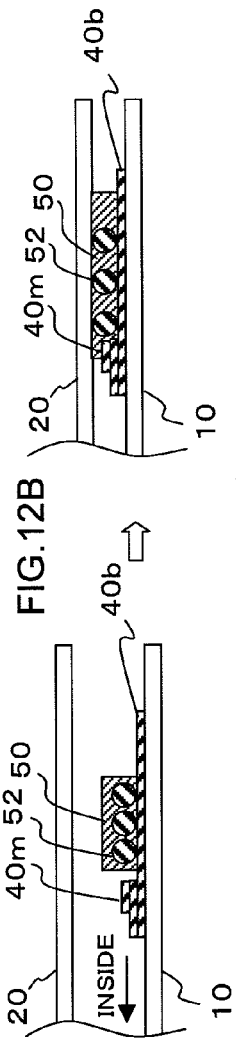
Figure 12C:
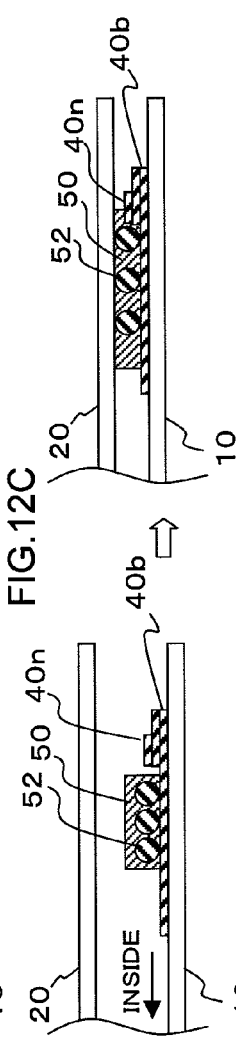
Figure 12D:
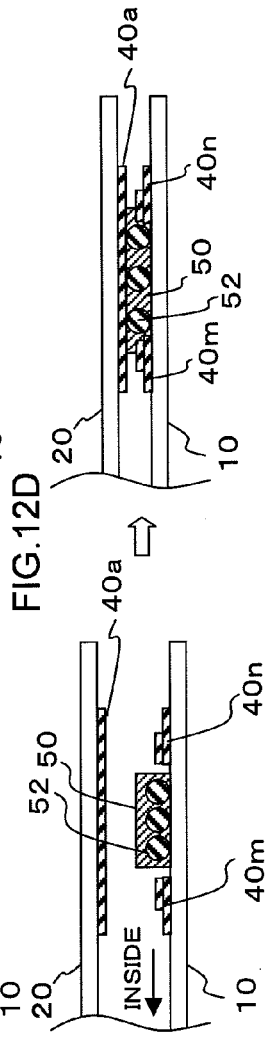

Further, as shown in FIG. 7C, seal seating layers 40a and 40b may be formed respectively on both the first and second substrate 10 and 20. In that case, it is not necessary that each of the seal seating layers 40a and 40b be a thick film, and thus the production process can be simplified.

Further, as shown in FIG. 8A, the seal seating layer 40 may be provided with two banks 40m and 40n on the inner and outer sides to form a groove 40h between the banks. The banks 40m and 40n describe closed loops surrounding the display area. The seal material 50 including the gap material 52 is applied onto the groove 40h. This corresponds to FIG. 5 mentioned above. In that case, the sealing gap n can be made very narrow, and the area of the seal material 50 in contact with the liquid crystals 30 can be small, and contamination of the seal material 50 can be suppressed.

Further, as shown in FIG. 8B, the seal seating layer 40 may be provided with only a bank 40m on the inner side. In that case too, the sealing gap n can be made very much, and the area of the seal material 50 in contact with the liquid crystals 30 can be small, and contamination of the seal material 50 can be suppressed.

Further, as shown in FIG. 8C, the seal seating layer 40 may be provided with only a bank 40n on the outer side, if necessary.

Further, as shown in FIG. 9A, banks 40m and 40n may be formed on the first substrate 10 so that a groove 40h is formed between the banks 40m and 40n. On the other hand, a series of seal seating layers 40a are formed on the second substrate 20 such that the seal seating layers 40a cover the bank 40m, the groove 40h and the bank 40n. The banks 40m and 40n describe closed loops surrounding the display area. The seal material 50 including the gap material 52 is applied to the groove 40h. This arrangement does not require that each layer should be a thick film. Further, the sealing gap n can be very narrow, and the area of the seal material 50 in contact with the liquid crystals 30 can be small, and contamination of the seal material 50 can be suppressed.

Further, as shown in FIG. 9B, it is possible to implement a mode in which the bank 40n of FIG. 9A is not provided. In that case too, the sealing gap n can be very narrow, and the area of the seal material 50 in contact with the liquid crystals 30 can be small, and contamination of the seal material 50 can be suppressed.

Further, as shown in FIG. 9C, in accordance with requirements, it is possible to implement a mode in which the bank 40m of FIG. 9A is not provided.

Further, as shown in FIGS. 10A and 10B, the widths of the banks 40m and 40n of FIG. 8A may be asymmetric. Further, as shown in FIGS. 10C and 10D, the widths of the banks 40m and 40n of FIG. 9A may be asymmetric. For example, the width of the bank 40m on the inner side may be larger than the width of the bank 40n on the outer side. Alternatively, the width of the bank 40m on the inner side may be smaller than the width of the bank 40n on the outer side. Either one may be suitably selected based on design concept.

Further, the width of the bank 40m or 40n may not be constant. The bank 40m or 40n may be formed such that its width changes depending on the distance from the substrate (the first substrate 10 or the second substrate 20) on which the bank is formed. FIGS. 11-14 show such examples.

FIGS. 11A, 11B, 11C and 11D correspond respectively to FIG. 8A, 8B, 8C and 9A mentioned above. The surface of the bank 40m or 40n more distant from the position to which the seal material 50 is applied (the surface on the display area side in the case of the bank 40m, or the surface opposite from the display area side in the case of the bank 40n) is nearly perpendicular to the substrate. On the other hand, the surface closer to the position to which the seal material 50 is applied (the surface opposite from the display area side in the case of the bank 40m, or the surface on the display area side in the case of the bank 40n) is a step-like or inclined surface. In other words, each of the banks 40m and 40n is formed such that its width becomes smaller as the distance from the first substrate 10 is larger. In FIG. 11A, the width of the groove 40h is narrower at deeper portions.

FIGS. 12A, 12B, 12C and 12D correspond respectively to FIGS. 8A, 8B, 8C and 9A mentioned above. The surface of the bank 40m or 40n closer to the position to which the seal material 50 is applied (i.e. the surface opposite from the display area side in the case of the bank 40m, or the surface on the display area side in the case of the bank 40n) is nearly perpendicular to the substrate. On the other hand, the surface more distant from the position to which the seal material 50 is applied (i.e. the surface on the display area side in the case of the bank 40m, or the surface opposite from the display area side in the case of the bank 40n) is a step-like or inclined surface.

FIGS. 13A, 13B and 13C correspond respectively to FIGS. 8A, 8B and 8C mentioned above. Both surfaces of the bank 40m or 40n, i.e. the surface closer to the position to which the seal material 50 is applied (the surface opposite from the display area side in the case of the bank 40m, or the surface on the display area side in the case of the bank 40n) and the surface more distant from the position to which the seal material 50 is applied (the surface on the display area side in the case of the bank 40m, or the surface opposite from the display area side in the case of the bank 40n), are step-like or inclined surfaces.

FIGS. 14A, 14B and 14C correspond respectively to FIGS. 9A, 9B and 9C mentioned above. Both surfaces of the bank 40m or 40n, i.e. the surface closer to the portion to which the seal material 50 is applied (the surface opposite from the display area side in the case of the bank 40m, or the surface on the display area side in the case of the bank 40n) and the surface more distant from the portion to which the seal material 50 is applied (the surface on the display area side in the case of the bank 40m, or the surface opposite from the display area side in the case of the bank 40n), are step-like or inclined surfaces.

The invention claimed is:

1. A liquid crystal display device comprising:
   a first substrate;
   a second substrate; and
   liquid crystals placed between the first and second substrates within a display area;
   wherein the first substrate and the second substrate are provided so as to surround the display area filled with the liquid crystals and are bonded to one another by means of a seal material including a gap material;
   wherein the first substrate is a color filter substrate having a color filter layer thereon;
   wherein the first substrate is provided with a seating layer on which the seal material is deposited thereon;
   wherein a layer thickness of the seating layer is greater than a layer thickness of the color filter layer corresponding to the display area;
   wherein the seating layer includes a groove into which the gap material is fitted,
   wherein:
   the seating layer includes an inner bank to form the groove adjacent to an inside of the liquid crystal display device, and the seal material is provided onto an inside of the groove and onto the inner bank.

2. A liquid crystal display device of claim 1, wherein the seating layer is formed on the first substrate by plural layers similar to layers that form the color filter layer of the first substrate.

3. A liquid crystal display device of claim 1, wherein the seating layer is formed on the first substrate by plural layers that form the color filter layer of the first substrate including at least one of a black matrix layer and an overcoat layer.

4. A liquid crystal display device of claim 1, further comprising:
   a seating layer formed on the second substrate continuously along the peripheral edge of the display area so as to align with the seating layer formed on the first substrate;
   wherein the seal material is placed between the seating layer of the first substrate and the seating layer of the second substrate, when the first substrate and the second substrate are bonded together.

5. A liquid crystal display device of claim 1, further comprising:
   a gap material on the seating layer;
   wherein the seal material surrounds the gap material; and
   wherein the seating layer is provided with banks formed on inner and outer sides to form a groove between the banks, and
   wherein the seal material including the gap material is placed in the groove between the banks on the seating layer.

6. A liquid crystal display device of claim 1, further comprising:
   a gap material on the seating layer;
   wherein banks are formed on the first substrate such that a groove is formed between the banks; and
   wherein the seal material including the gap material is placed in the groove between the banks on the first substrate.

7. A liquid crystal display device of claim 1, wherein the seal material is only disposed on the seating layer formed on the first substrate.

8. A liquid crystal display device of claim 1, wherein:
   the seating layer having a layer thickness greater than a layer thickness of the color filter layer, and the seal material having a layer thickness smaller than a layer thickness of the liquid crystal are formed continuously along a peripheral edge of the display area.

9. A liquid crystal display device of claim 1, wherein:
   a ratio of a height of the gap material to a depth of the groove is 1.1 or more.

10. A liquid crystal display device of claim 1, wherein:
    the seating layer includes an outer bank to form the groove adjacent to an outside of the liquid crystal display device, and the seal material is also provided onto the outer bank.

11. A liquid crystal display device of claim 1, wherein the seating layer includes banks to form sidewalls of the groove in the seating layer, and wherein the banks are partially covered by the seal material so that the seal material has an uneven layer thickness across the seating layer with a thinner thickness portion of the seal material interfacing the liquid crystals.

12. A liquid crystal display device production method for producing a liquid crystal display device that comprises a first substrate, a second substrate and liquid crystals placed between the first and second substrates within a display area, wherein the first substrate comprises a color filter substrate having a color filter layer thereon, the liquid crystal display device production method comprising:
    applying a seal material, including a gap material, onto a seating layer formed on the first substrate, such that the seal material surrounds the display area to be filled with the liquid crystals before the first substrate and the second substrate are bonded together; and bonding the first substrate and the second substrate together, via the seal material applied on the seating layer formed on the first substrate, such that the first and second substrates and the seal material surround the display area filled with the liquid crystals;

wherein the seating layer is formed on the first substrate such that a layer thickness of the seating layer is greater than a layer thickness of the color filter layer corresponding to the display area, and wherein the seating layer includes a groove into which the gap material is fitted, wherein:

the seating layer includes an inner bank to form the groove adjacent to an inside of the liquid crystal display device, and the seal material is provided onto an inside of the groove and onto the inner bank.

13. A liquid crystal display device production method of claim 12, wherein the seating layer is formed on the first substrate by plural layers similar to layers that form the color filter layer of the first substrate.

14. A liquid crystal display device production method of claim 12, wherein the seating layer is formed on the first substrate by plural layers that form the color filter layer of the first substrate including at least one of a black matrix layer and an overcoat layer.

15. A liquid crystal display device production method of claim 12, wherein the seal material is only formed on the seating layer formed on the first substrate.

16. A liquid crystal display device production method of claim 12, wherein:

the seating layer having a layer thickness greater than a layer thickness of the color filter layer, and the seal material having a layer thickness smaller than a layer thickness of the liquid crystal are formed continuously along a peripheral edge of the display area.

17. A liquid crystal display device production method of claim 12, wherein:

a ratio of a height of the gap material to a depth of the groove is 1.1 or more.

18. A liquid crystal display device production method of claim 12, wherein:

the seating layer includes an outer bank to form the groove adjacent to an outside of the liquid crystal display device, and the seal material is also provided onto the outer bank.

19. A liquid crystal display device production method of claim 12, wherein the seating layer includes banks to form sidewalls of the groove in the seating layer, and wherein the banks are partially covered by the seal material so that the seal material has an uneven layer thickness across the seating layer with a thinner thickness portion of the seal material interfacing the liquid crystals.

20. A liquid crystal display device comprising:

a first substrate having a seal seating layer provided along a peripheral edge of the first substrate forming a closed loop to enclose a display area therein, and a color filter layer formed in the display area;

a second substrate; and liquid crystals disposed between the first and second substrates within the display area;

wherein the first substrate and the second substrate are provided so as to surround the display area filled with the liquid crystals and are bonded to one another by means of a seal material including a gap material;

wherein the seal seating layer exhibits a layer thickness greater than a layer thickness of the color filter layer formed on the first substrate in the display area; and wherein the seal seating layer includes a groove into which the gap material is fitted, wherein:

the seal seating layer includes an inner bank to form the groove adjacent to an inside of the liquid crystal display device, and the seal material is provided onto an inside of the groove and onto the inner bank.

21. A liquid crystal display device of claim 20, wherein the seal seating layer is formed on the first substrate by plural layers similar to layers that form the color filter layer of the first substrate.

22. A liquid crystal display device of claim 20, wherein the second substrate is further provided with a seal seating layer provided along a peripheral edge of the second substrate so as to align with the seal seating layer formed on the first substrate, and wherein the seal material is disposed between the seal seating layer of the first substrate and the seal seating layer of the second substrate, when the first substrate and the second substrate are bonded together.

23. A liquid crystal display device of claim 20, wherein:

the seal seating layer having a layer thickness greater than a layer thickness of the color filter layer, and the seal material having a layer thickness smaller than a layer thickness of the liquid crystal are formed continuously along a peripheral edge of the display area.

24. A liquid crystal display device of claim 20, wherein:

a ratio of a height of the gap material to a depth of the groove is 1.1 or more.

25. A liquid crystal display device of claim 20, wherein:

the seal seating layer includes an outer bank to form the groove adjacent to an outside of the liquid crystal display device, and the seal material is also provided onto the outer bank.

26. A liquid crystal display device of claim 20, wherein the seating layer includes banks to form sidewalls of the groove in the seal seating layer, and wherein the banks are partially covered by the seal material so that the seal material has an uneven layer thickness across the seating layer with a thinner thickness portion of the seal material interfacing the liquid crystals.

* * * * *